United States Patent [19]

Gjestrum et al.

[11] Patent Number: 5,051,966

[45] Date of Patent: Sep. 24, 1991

[54] FASTENING MEANS FOR SEISMIC EQUIPMENT

[75] Inventors: Einar Gjestrum, Sandvika; Lars Knudsen; Tormod Skifjeld, both of Drammen, all of Norway

[73] Assignee: Geco A.S., Sandvika, Norway

[21] Appl. No.: 435,330

[22] Filed: Nov. 13, 1989

[30] Foreign Application Priority Data

Nov. 11, 1988 [NO] Norway ................................ 885044

[51] Int. Cl.[5] ........................................... H04R 23/00
[52] U.S. Cl. .................... 367/153; 367/144; 367/173; 181/110; 181/120
[58] Field of Search ............... 367/144, 153, 142, 173; 181/120, 110, 118

[56] References Cited

U.S. PATENT DOCUMENTS

| | | | |
|---|---|---|---|
| 3,699,507 | 10/1972 | Massa | 367/153 |
| 4,038,630 | 7/1977 | Chelminski | 181/110 |
| 4,658,387 | 4/1987 | Dolengowski et al. | 367/144 |
| 4,715,023 | 12/1987 | Otto | 367/144 |
| 4,719,987 | 1/1988 | George, Jr. et al. | 181/114 |
| 4,970,046 | 11/1990 | Dolengowski | 367/153 |

FOREIGN PATENT DOCUMENTS 0228832 7/1987 European Pat. Off. .

OTHER PUBLICATIONS

"A New High-Resolution or Deep Penetration Airgun Array", by H. Brandsaeter et al., Geophysics, vol. 44, 1979, pp. 865-879.

Primary Examiner—Deborah L. Kyle
Assistant Examiner—J. Woodrow Eldred
Attorney, Agent, or Firm—Fleit, Jacobson, Cohn, Price, Holman & Stern

[57] ABSTRACT

A fastening device for fixing seismic circular devices is designed with a rigid, split, annular clamp (4) with an open void facing the seismic device (1) for insertion of at least one shock absorbing member (7) in the void. Such a clamp (4) is provided in the region of the device which is most subjected to strain, where a concentric securing ring (8) is also mounted, about which the clamp is fitted with a shock absorbing member (7) on each side of the ring. One more such clamp is provided on the seismic device (1) in order to distribute the load. This arrangement is especially suitable for use in connection with seismic airguns which are to be fixed at predetermined mutual distances in a frame structure (2).

22 Claims, 2 Drawing Sheets

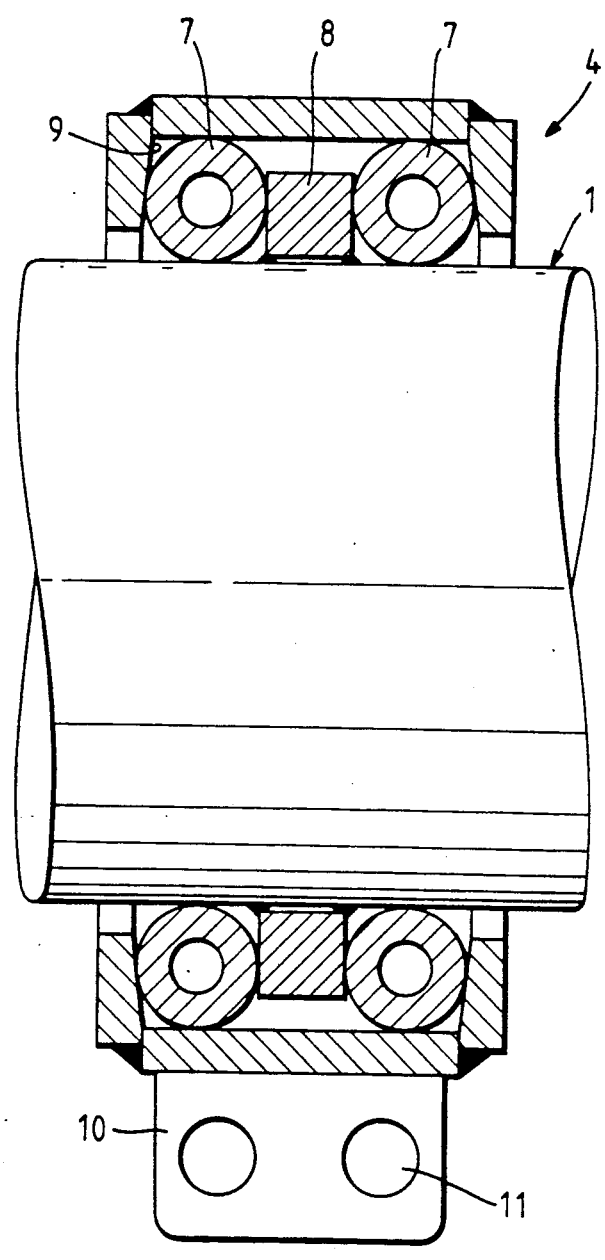
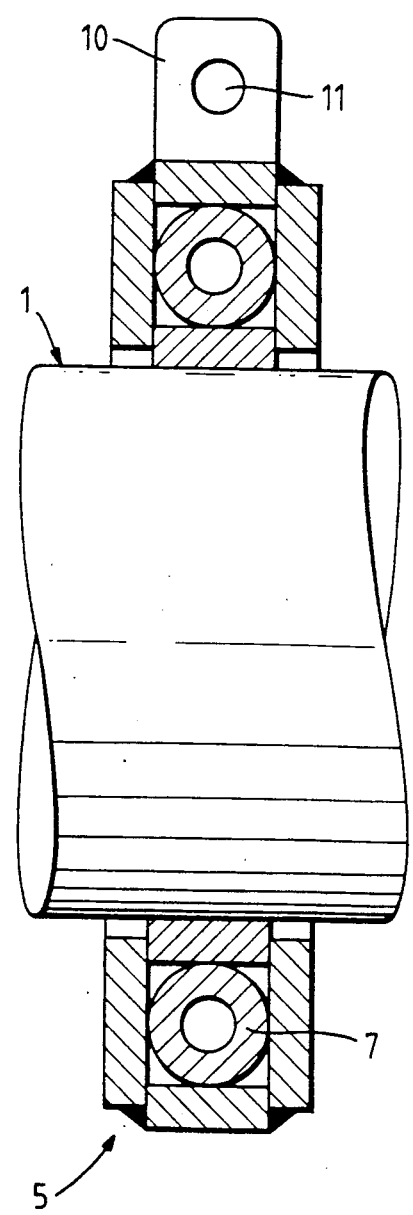

FASTENING MEANS FOR SEISMIC EQUIPMENT

BACKGROUND OF THE INVENTION

The invention relates to a fastening means for fixing seismic devices of circular shape, especially seismic energy sources airguns, for example, in a defined manner, and especially intended for fixing at least two devices firmly at a mutual distance in a frame structure.

In seismic surveys at sea an array of different seismic devices is towed in the water. In part, such devices are sensitive as regards impact or shock loads, and in part, the towing system proper is sensitive to such loads. Special problems arise in connection with suspending such seismic acoustic sources, e.g. airguns, which are towed in arrays behind the seismic vessel, since they are suspended from below raft arrangements, and the like. Due to the shock and impact loads triggered when the guns are fired, tugs and wear will result both in the air conduits extending to the guns, and in electric control lines, as well as in suspension members. Furthermore, wear and undesirable effects will also arise due to movement of the water, i.e. waves as well as general movement due to towing. Such problems will occur both with separately suspended guns and with guns suspended in framelike devices, in so called clusters.

In an article in the magazine Geophysics, Vol. 44, No. 5 (May 1979), pp 865-879 assembling of airguns in a group or a "cluster" is described, where the guns are attached to the frame at predetermined mutual distances, so that they may be fired while in a constant geometrical arrangement and without said geometrical arrangement being changed by or after firing. Such mounting of airguns in a frame structure results in a number of advantages in seismic surveys, but this technique was known for a long time and does not form any part of the present invention.

In U.S. Pat. No. 4,719,987 (corresponding to Norwegian Patent Application No. 85 2459) another design is shown with seismic sources of energy suspended in groups, where the sources of energy are maintained at a predetermined mutual distance by the aid of a chain means which is attached to the sources by the aid of sleeves. Neither of the above-mentioned publications, however, discloses the mounting of the seismic energy sources in detail.

The mounting proper of such sensitive seismic equipment, however, proved to be critical and decisive to the results achieved during survey, as shock and impact effects may cause distortion of signals, and in case of a group arrangement of airguns in frame structures or chain constellations mutual distances may be changed so that the desired results may not be achieved.

BRIEF SUMMARY OF THE INVENTION

It is, thus, an object of the present invention to provide a fastening means, especially intended for use with circular seismic equipment, in which the problem caused by transfer of impact or shock loads is avoided, at the same time as mechanical wear is to be reduced to a minimum, both on seismic equipment, supply lines to seismic equipment, and of course, the suspension means proper. It is a further object to provide a fastening means by the aid of which it will be possible, in case of localization in a frame of, e.g. seismic airguns, to maintain the accurate position of the guns in relation to other guns, hydrophones, the towing vessel, and signal receiving cables (streamers).

The fastening means should be useful both for single guns and for clustered guns. In the last mentioned constellation the greatest advantages of the invention will be achieved.

In the fastening means of this invention the above-mentioned objects are substantially achieved, and a seismic system which is able to provide a stable output signature is ensured.

BRIEF DESCRIPTION OF THE DRAWINGS

The invention will be disclosed in more detail below with reference to embodiments shown in the accompanying drawing, wherein:

FIG. 3 is a diametrical cross-sectional view illustrating a main fastening member according to the invention; and FIG. 4 is a view similar to FIG. 3 illustrating the additional fastening means according to the invention.

DETAILED DESCRIPTION

Figure 1:
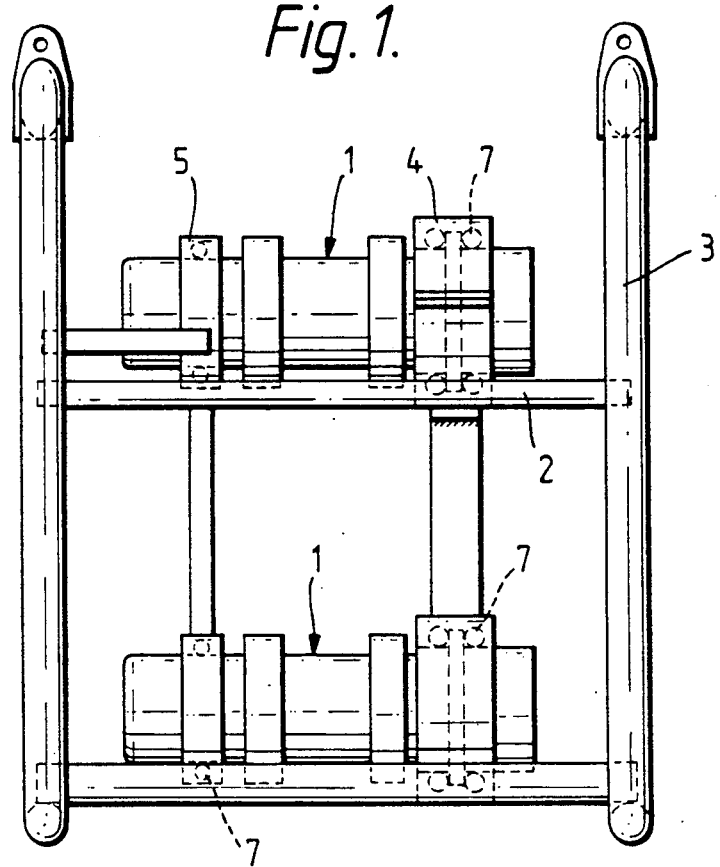
FIG. 1 is a side elevational view showing an arrangement of seismic airguns in a frame structure in a side elevation.

In the drawing the invention is embodied by fastening means mounted in a cluster to be towed behind a seismic vessel in a manner corresponding to that disclosed in the two above mentioned publications.

The Figures show airguns 1 to be provided in a frame comprising an inner portion 2 and an outer portion 3. The fastening means for airguns 1 comprises a main portion 4 and an additional member 5. Both members are designed as hollow clamps with the void facing inwards, towards the airgun, and with a shape corresponding to that of the airgun to be able to envelope the latter tightly. Both clamps 4 and 5 are, thus, concentric with the airgun. Clamps 4, 5 are split, preferably, into two portions and, dependent on the mounting technique and place of mounting, they may be designed for different joining methods. In the embodiment shown two clamp portions are used, which are provided with cooperating flanges, if desired, with a hinge on one side. The flanges may be bolted together, as diagrammatically shown in FIG. 2 at reference numeral 6. Such an attachment must be considered known per se. In the inner void of clamps impact and shock absorbing buffers are provided, preferably in the shape of circular, hose shaped members which are placed about the entire circumference of the airgun. Said members are designated 7 in the Figures. A suitable material for these impact absorbing members is "Adepren".

In the most strained area of the airgun, where the strongest impact absorption and at the same time, the strongest hold is necessary, a ring 8 is provided, preferably by welding, to be concentric with the airgun. Main clamp 4 is designed with sufficient width to encase said ring and to provide space for an impact absorbing member 7 on each side, as shown in FIG. 3. In this manner clamp 4 will be accurately fixed in the correct localization, at the same time as very good transfer of forces is achieved from the outside of the gun, via both impact absorbing members 7, to the clamp proper, which is in turn secured to frame structure 2, 3. In order to provide an additionally secured hold the clamp walls facing towards the internal clamp void may e.g. be inclined as indicated at 9 in FIG. 3 to form a frustoconical surface for urging shock absorber 7 toward ring 8. Ring 8 may also have similar, but oppositely directed, frustoconical surfaces (not shown) for urging shock absorber 7 toward the clamp walls.

For further attachment of other seismic equipment, or to secure one single seismic gun, a lug 10 with a securing hole 11 may be provided on the clamp, as indicated lowermost in FIG. 3 and uppermost in FIG. 4.

FIG. 4 shows the further clamp which is used according to the invention and is designated 5. This further clamp is generally not as strong as clamp 4, not being provided in the pressure loaded area. The clamp is, thus, only provided with one shock absorbing member 7, and otherwise substantially the same design as clamp 4. This clamp may also be provided with a lug 10.

Figure 2:
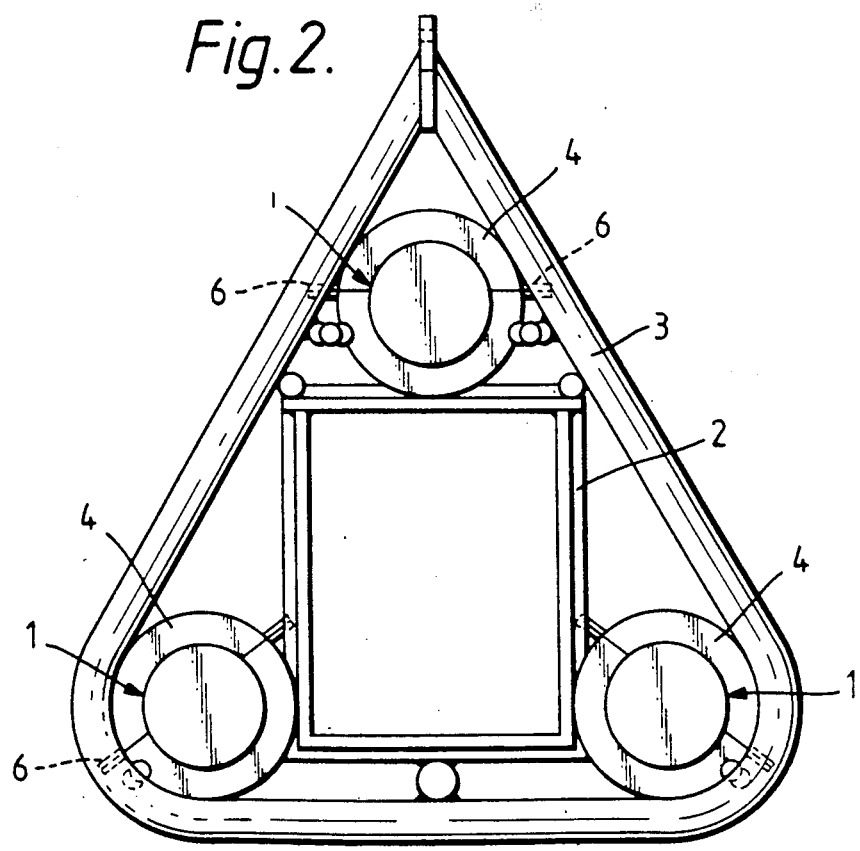
FIG. 2 is a right end view of the arrangement of FIG. 1.

By using two clamps 4 and 5, as illustrated, airguns and other seismic equipment may be provided in a most shock-proof and protected manner, e.g. in frame structures as shown in FIG. 1 and FIG. 2, or be secured directly in connection with a buoyancy means without too much wear ocurring in the transfer elements, impact loads being absorbed by the shock absorbing members 7. Mounting of the fastening means is very simple, the fastening means will be inexpensive in production, and it will be very reliable and efficient in use. Even though the embodiment disclosed is in connection with use for airguns, suspension of other impact sensitive equipment may be achieved with clamps according to the invention. Many modifications are possible within the scope of the invention, such as the void of the clamp is not necessarily square, but may have other shapes. Also, it will be possible to use two double clamps 4 instead of one clamp 4 and a clamp 5, or in cases of less strain possibly two simple clamps 5 may be used. The clamp may be mounted by welding or fastening with screws to the frame structures or other members, or lug structures as illustrated, may be used.

We claim:

1. A fastening means for fixing circular seismic devices in mutually spaced relationship, each seismic device having a high strain region, comprising:
   a frame;
   an outwardly projecting ring member positioned concentrically around and attached to said high strain region of each seismic device;
   at least two rigid annular split first clamps mounted in fixed spaced relationship on said frame for receiving said seismic devices therein;
   a substantially annular void in each first clamp open inwardly toward the seismic device in said first clamp, said ring member on a respective seismic device being received in said void;
   two shock absorbing members in said void for engaging a seismic device in said first clamp, one of said shock absorbing members being on each side of said ring member; and
   at least two additional second clamps mounted on said frame in fixed spaced relationship with respect to each other and with respect to said first clamps, respectively, for receiving therein a region of a respective seismic device spaced from said high strain region thereof.

2. A fastening means as claimed in claim 1 wherein: each of said second clamps comprises a substantially annular void therein open inwardly towards the seismic device in said second clamp; and
   a single shock absorbing member is provided in said void in each second clamp for engaging a seismic device in said second clamp.

3. A fastening means as claimed in claim 1 wherein: each first and second clamp is bissected to form two clamp portions;
   said two clamp portions are connected together by hinge means to facilitate opening and closing each clamp; and
   securing bolt means are provided for retaining said clamp portions in a closed position.

4. A fastening means as claimed in claim 2 wherein: each first and second clamp is bissected to form two clamp portions;
   said two clamp portions are connected together by hinge means to facilitate opening and closing each clamp; and
   securing bolt means are provided for retaining said clamp portions in a closed position.

5. A fastening means as claimed in claim 1 and further comprising:
   side walls on at least said first clamps at the sides of said void, each side wall having a frustoconical shape for clamping said shock absorbing members between said side walls and said ring member.

6. A fastening means as claimed in claim 1 and further comprising:
   side walls on at least said first clamps at the sides of said void; and
   side walls on said ring member having a frustoconical shape for clamping said shock absorbing members in said void between said ring member and said side walls on a respective one of said first clamps.

7. A fastening means as claimed in claim 1 and further comprising:
   lug means on at least said first clamps; and
   holes in said lug means.

8. A fastening means as claimed in claim 1 wherein: said shock absorbing members comprise circular tubular members of hard rubber material.

9. A fastening means as claimed in claim 1 wherein: said frame comprises an external frame member and an internal frame skeleton attached to and within said external frame member; and
   said first and second clamps are welded to said external frame member and said internal frame skeleton.

10. A fastening means as claimed in claim 4 wherein: said frame comprises an external frame member and an internal frame skeleton attached to and within said external frame member; and
    said first and second clamps are welded to said external frame member and said internal frame skeleton.

11. A fastening means as claimed in claim 1 wherein: said seismic devices comprise airguns.

12. A fastening means as claimed in claim 1 wherein: each clamp is asymmetrically divided to form said split.

13. A fastening means as claimed in claim 4 wherein: each clamp is asymmetrically divided to form said split.

14. A fastening means for fixing circular seismic devices in mutually spaced relationship, comprising:
    a frame;
    at least two rigid annular split clamps mounted in spaced relationship on said frame for receiving said seismic devices therein, each clamp being asymmetrically divided to form said split;

a substantially annular void in each clamp open inwardly toward the seismic device in said clamp; and at least one shock absorbing member in said void for engaging a seismic device in a respective clamp.

15. A fastening means for fixing circular seismic devices in mutually spaced relationship in a frame, each seismic device having a high strain region, comprising:

an outwardly projecting ring member positioned concentrically around and attached to said high strain region of each seismic device;

a rigid annular split first clamp for receiving a seismic device therein;

a void in said first clamp open inwardly toward the seismic device in said first clamp, said ring member on the seismic device being received in said void;

two shock absorbing members in said void for engaging the seismic device in said first clamp, one of said shock absorbing members being on each side of said ring member; and a second clamp is fixed spaced relationship with respect to said first clamp for receiving therein a region of the seismic device spaced from said ring member.

16. A fastening means as claimed in claim 15 wherein:
said second clamp has a void therein open inwardly towards the seismic device in said second clamp; and a single shock absorbing member is provided in said void in said second clamp for engaging the seismic device in said second clamp.

17. A fastening means as claimed in claim 15 wherein:
each first and second clamp is bissected to form two clamp portions;

said two clamp portions are connected together by hinge means to facilitate opening and closing each clamp; and securing bolt means are provided for retaining said clamp portions in a closed position.

18. A fastening means as claimed in claim 15 and further comprising:
side walls on at least said first clamp at the sides of said void in said first clamp, each side wall having a frustoconical shape for clamping said shock absorbing members between said side walls and said ring member.

19. A fastening means as claimed in claim 15 and further comprising:
side walls on at least said first clamp at the sides of said void in said first clamp; and side walls on said ring member having a frustoconical shape for clamping said shock absorbing members in said void between said ring member and said side walls.

20. A fastening means as claimed in claim 15 wherein:
said shock absorbing members comprise circular tubular members of hard rubber material.

21. A fastening means as claimed in claim 15 wherein:
said seismic device comprises an airgun.

22. A fastening means for fixing circular seismic devices in mutually spaced relationship in a frame, comprising:

a rigid annular split clamp for receiving a seismic device therein, each clamp being asymmetrically divided to form said split;

a void in said clamp open inwardly toward the seismic device in said clamp; and at least one shock absorbing member in said void for engaging a seismic device in said clamp.

* * * * *